US 6,662,158 B1

(12) United States Patent
Hon et al.

(10) Patent No.: US 6,662,158 B1
(45) Date of Patent: Dec. 9, 2003

(54) TEMPORAL PATTERN RECOGNITION METHOD AND APPARATUS UTILIZING SEGMENT AND FRAME-BASED MODELS

(75) Inventors: Hsiao-Wuen Hon, Woodinville, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,506

(22) Filed: Apr. 27, 2000

(51) Int. Cl.[7] ............................................. G10L 15/04
(52) U.S. Cl. ..................... 704/252; 704/240; 704/256
(58) Field of Search ................................ 704/231, 235, 704/238, 239, 240, 246, 248, 249, 250, 251, 252, 256

(56) References Cited

U.S. PATENT DOCUMENTS

| | | | |
|---|---|---|---|
| 4,914,703 A | | 4/1990 | Gillick .......................... 381/43 |
| 5,133,012 A | * | 7/1992 | Nitta ............................ 704/256 |
| 5,369,726 A | | 11/1994 | Kroeker et al. ............. 395/2.45 |
| 5,572,624 A | | 11/1996 | Sejnoha ........................ 395/265 |
| 5,617,509 A | * | 4/1997 | Kushner et al. .............. 704/246 |
| 5,625,749 A | * | 4/1997 | Goldenthal et al. .......... 704/246 |
| 5,787,396 A | | 7/1998 | Komori et al. ............... 704/256 |
| 5,937,384 A | | 8/1999 | Huang et al. ................. 704/256 |
| 6,055,498 A | * | 4/2000 | Neumeyer et al. ........... 704/246 |
| 6,092,045 A | * | 7/2000 | Stubley et al. ............... 704/254 |
| 6,185,528 B1 | * | 2/2001 | Fissore et al. ............... 704/232 |

OTHER PUBLICATIONS

"Probabilistic–trajectory segmental HMMs", *Computer Speech and Language*, by Wendy J. Holmes et al., Article No. csla. 1998.0048, pp. 3–37 (1999).

"Parametric Trajectory Mixtures for LVCSR", by Man-hung Siu et al., ICSLP–1998, 4 pages.

"Speech Recognition Using Hidden Markov Models with Polynomial Regression Functions as Nonstationary States", by Li Deng et al., IEEE Transactions on Speech and Audio Processing, vol. 2, No. 4, pp. 507–520 (Oct. 1994).

"From HMM's to Segment Models: A Unified View of Stochastic Modeling for Speech Recognition", by Mari Ostendorf et al., IEEE Transactions on Speech and Audio Processing, vol. 4, No. 5, pp. 360–379 (Sep. 1996).

U.S. patent application Ser. No. 09/559,505, Ho et al., filed Apr. 27, 2000.

* cited by examiner

*Primary Examiner*—Daniel Abebe
(74) *Attorney, Agent, or Firm*—Theodore M. Magee; Westman, Champlin & Kelly, P.A.

(57) ABSTRACT

A method and apparatus is provided for identifying patterns from a series of feature vectors representing a time-varying signal. The method and apparatus use both a frame-based model and a segment model in a unified framework. The frame-based model determines the probability of an individual feature vector given a frame state. The segment model determines the probability of sub-sequences of feature vectors given a single segment state. The probabilities from the frame-based model and the segment model are then combined to form a single path score that is indicative of the probability of a sequence of patterns. Another aspect of the invention is the use of a frame-based model and a segment model to segment feature vectors during model training. Under this aspect of the invention, the frame-based model and the segment model are used together to identify probabilities associated with different segmentations.

22 Claims, 3 Drawing Sheets

TEMPORAL PATTERN RECOGNITION METHOD AND APPARATUS UTILIZING SEGMENT AND FRAME-BASED MODELS

BACKGROUND OF THE INVENTION

The present invention relates to temporal pattern recognition. In particular, the present invention relates to the use of segment models to perform temporal pattern recognition.

Temporal pattern recognition refers to the identification of salient trends in time-varying signals, e.g., speech, handwriting, stock quotes, etc. For instance, the patterns to be recognized in speech are syllables, words, phrases, or other phonologically significant linguistic units. For handwriting, the patterns are strokes of written letters, words, ideograms, or logograms. Though the following descriptions focus on speech recognition systems, the same principles apply to other temporal pattern recognition systems as well.

In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector represents a section of the speech signal.

The feature vectors are then used to identify the most likely sequence of words that would have generated the sequence of feature vectors. Typically, this involves applying the feature vectors to a frame-based acoustic model to determine the most likely sequences of sub-word units, typically senones, and then using a language model to determine which of these sequences of sub-word units is most likely to appear in the language. This most likely sequence of sub-word units is then identified as the recognized speech.

Typically, the frame-based acoustic model is a Hidden Markov Model that is constructed from a series of interconnected states. Each state includes a set of probability functions that are used to determine the likelihood that the state would generate a frame's feature vector. The model also includes probabilities for transitioning between states as well as a list of allowable state sequences for each possible sub-word unit.

In order to make frame-based Hidden Markov Models computationally feasible, several assumptions must be made. First, the transition probability between two states is assumed to only depend on the two states. It does not depend on any earlier states or any previous feature vectors.

Second, the duration of a sub-word unit is assumed to be set by repeating one or more states. This second assumption means that sub-word units of longer duration are less favored by the model than shorter duration sub-word units because the repetition of a state will result in lower probability. In fact, under this second assumption, a sub-word unit has its highest duration probability when its duration is as short as possible. However, this does not match human speech where the most probable duration for a sub-word unit is usually longer than this minimum duration.

The third assumption used in frame-based Hidden Markov Models is that the probability of generating a feature vector is assumed to be dependent only on the current feature vector and the current state. It is not dependent on past states or past feature vectors. This is sometimes referred to as conditional independent observation and is the reason that Hidden Markov Models are known as quasi-stationary models. Because they are piecewise stationary, such models do not model large-scale transitions in speech well. Thus, these models usually overlook transitions between neighboring states as long as the quasi-stationary portion are modeled well by the HMM's output probability distributions.

The failure of frame-based Hidden Markov Models to track long-range transitions well and the problem frame-based Hidden, Markov Models have in modeling the correct duration for a sub-word unit are thought to be limiting factors in the performance of some speech recognition systems. To overcome these problems, some prior art systems have developed models for longer sections of speech. These longer models, known as segment models, take multiple past feature vectors into consideration when making a determination of the likelihood of a particular segment unit. In addition, these models are explicitly trained to detect the most likely duration for each segment unit.

Although segment models generally model long-range transitions better than frame-based Hidden Markov Models, they do not model steady states as well. Some attempts have been made to improve the resolution of segment models by shortening the segment size. However, the performance of these segment models is still not as accurate as frame-based Hidden Markov Models.

Some systems have attempted to combine frame-based Hidden Markov Models with segment models using a two-tier approach. In these systems, frame-based Hidden Markov Models are first used to identify n-best possible sequences of sub-word units (or a lattice of sub-word units). Each of these n-best sequences is then provided to a segment model, which identifies the most likely sequence. One problem with such a two-tier approach is that the frame-based Hidden Markov Model may discard the best sequence of sub-word units before the segment model has an opportunity to determine the sequence's likelihood. In addition, under such systems, the frame-based Hidden Markov Model and the Segment Model are trained separately. As such, they may not be trained to work ideally with each other.

Because of these problems, a new recognition system is needed that models both long-range transitions and quasi-stationary portions of a temporal signal and that accurately determines the duration of sub-units in the temporal signal.

SUMMARY OF THE INVENTION

A method and apparatus is provided for identifying patterns from a series of feature vectors representing a temporal signal. The method and apparatus use both a frame-based model and a segment model in a unified framework. The frame-based model determines the probability of an individual feature vector given a frame state. The segment model determines the probability of sub-sequences of feature vectors given a single segment state. The probabilities from the frame-based model and the segment model are then combined to form a single path score that is indicative of the probability of a sequence of patterns. Under one embodiment of this framework, the boundaries of sub-units are synchronized between both models. Such a path with highest joint probability will be the best hypothesis generated by the unified models and thus provide the best recognition result.

Another aspect of the invention is the use of a frame-based model and a segment model to segment feature vectors during model training. Under this aspect of the invention, the frame-based model and the segment model are used together to identify probabilities associated with different segmentations. The segmentation with the highest probability is then used to retrain the frame-based model and the segment model. The revised models are then used to identify a new segmentation. This iterative process continues until both the frame-based model and segment model converge.

DETAILED DESCRIPTION OF ILLUSTRATIVE EMBODIMENTS

Figure 1:
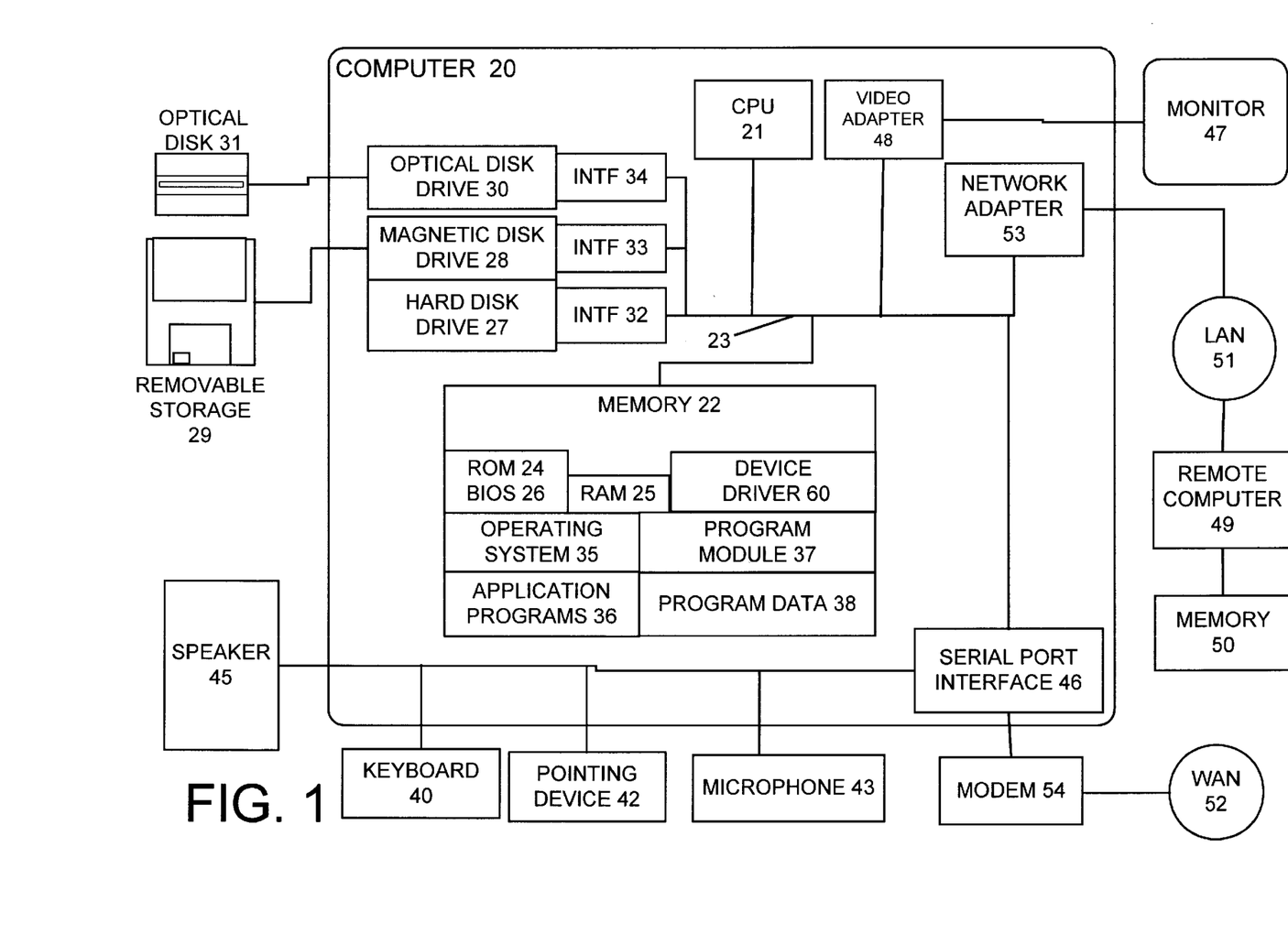
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
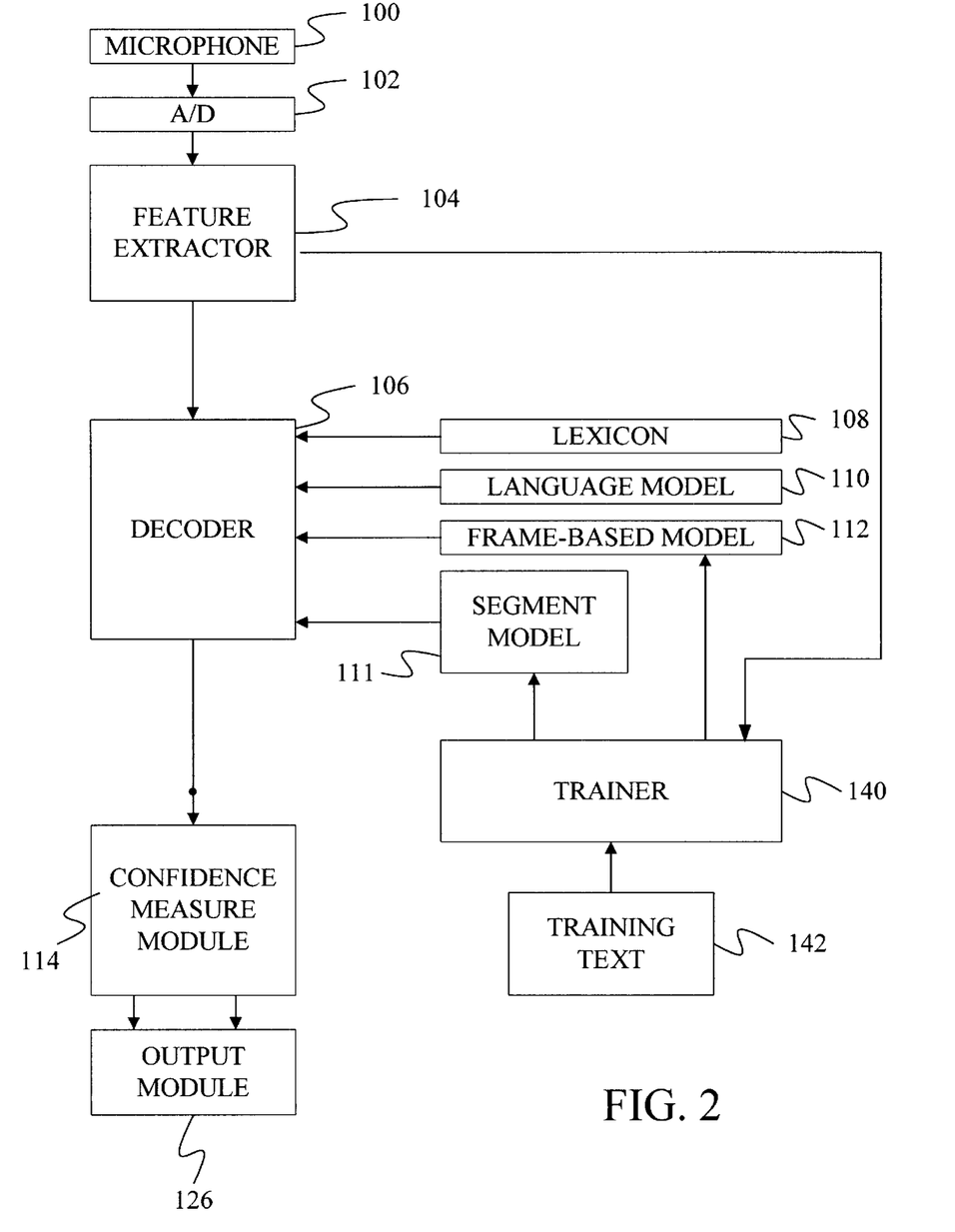
FIG. 2 is a block diagram of a speech recognition system of an embodiment of the present invention.

FIG. 2 provides a more detailed block diagram of modules of the general environment of FIG. 1 that are particularly relevant to the present invention. In FIG. 2, an input signal is converted into an electrical signal, if necessary, by a converter 100. The electrical signal is then converted into a series of digital values by an analog-to-digital converter 102. In several embodiments, A-to-D converter 102 samples the analog signal at 16 kHz thereby creating 16 kilobytes of speech data per second.

In speech recognition embodiments, the input signal is an analog speech signal that is converted into an electrical signal by a microphone, which acts as converter 100 and is connected to analog-to-digital (A-to-D) converter 102. In handwriting recognition embodiments, converter 100 and A-to-D converter 102 are formed in an optical scanner that produces digital signals indicative of the visual appearance of the handwriting.

The digital data is provided to a feature extractor 104 that extracts a feature from the digital signal. For speech recognition embodiments, examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values and produces a stream of feature vectors that are each associated with a frame of the input signal. In many speech embodiments, the centers of the frames are separated by 10 milliseconds.

The stream of feature vectors produced by the extraction module is provided to a decoder 106, which identifies a most likely sequence of patterns based on the stream of feature vectors, a frame-based model 108, a segment model 111, a language model 110, and a lexicon 112.

In most embodiments, frame-based model 108 is a Hidden Markov Model consisting of a set of hidden states, with one state per frame of the input signal. Each state has an associated set of probability distributions that describe the likelihood of an input feature vector matching a particular state. The model also includes probabilities for transitioning between two neighboring model states as well as allowed transitions between states for particular pattern units. The size of the pattern units can be different for different embodiments of the present invention. For example, for speech recognition embodiments where the pattern units are linguistic units, the pattern units may be senones, phonemes, diphones, triphones, syllables, or even whole words.

Segment model 111 indicates how likely it is that a sequence of feature vectors would be produced by a segment of a particular duration (described by a probabilistic duration model). The segment model differs from the frame-based model because it uses multiple feature vectors at the same time to make a determination about the likelihood of a particular segment. Because of this, it provides a better model of long-range transitions in the input signal. In addition, the segment model looks at multiple durations for each segment and determines a separate probability for each duration. As such, it provides a more accurate model for segments that have longer durations. Several types of segment models may be used with the present invention including probabilistic-trajectory segmentmodels.

Lexicon 112 consists of a list of labels that identify the patterns to be recognized. In a speech recognition embodiment, a lexicon may comprise linguistic words or syllables. In an embodiment where the temporal signal to be analyzed is the financial data of the economy, for instance, the lexicon may be a list salient descriptions of the data being modeled, such as "recession", "expansion", "recovery", etc.

Language model 110 provides a set of likelihoods that a particular sequence of patterns will appear in the environment of interest. For example, in speech recognition and handwriting recognition, language model 110 provides a set of likelihoods that a particular sequence of words will appear in a particular language. In many speech embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of patterns based on the combined probabilities of three-pattern segments of the sequence. For example, in speech recognition, the trigram model is based on the combined probabilities of three-word segments.

Based on the frame-based model, the segment model, the language model, and the lexicon, decoder 106 identifies a most likely sequence of patterns from all possible pattern sequences. The particular method used to select the most probable sequence of patterns is discussed further below with specific reference to a speech recognition system. Although a speech recognition system is used below, the present invention is not limited to speech recognition and may be applied to any temporal pattern recognition system.

The most probable sequence of hypothesis patterns is provided to confidence measure module 114. Confidence measure module 114 identifies which patterns are most likely to have been improperly identified by the recognizer, based in part on a secondary frame-based model. Confidence measure module 114 then provides the sequence of hypothesis patterns to an output module 126 along with identifiers indicating which patterns may have been improperly identified. Those skilled in the art will recognize that confidence measure module 114 is not necessary for the practice of the present invention.

In one embodiment of the invention, the decoding process used by decoder 106 is based on a probability calculation that combines a frame-based model probability with a segment model probability. This probability calculation is derived from the following basic probability equation for selecting a most likely sequence of hypothesized patterns:

$$\hat{W}=\arg_W\max p(W|O) \qquad \text{EQ. 1}$$

where $\hat{W}$ is the most likely hypothesized word string (more generally, the most likely hypothesized pattern string), W is a word string hypothesis (more generally, a pattern string hypothesis), O is the complete sequence of input feature vectors, and p(W|O) is the probability of the pattern string hypothesis given the complete sequence of input feature vectors.

Using Bayes theorem and ignoring the resulting denominator, Equation 1 can be converted into:

$$\hat{W}=\arg_W\max p(O|W)p(W) \qquad \text{EQ. 2}$$

where p(O|W) is the probability of the observed sequence of feature vectors given the pattern string hypothesis, and p(W) is the probability of the pattern string hypothesis appearing in the language. The probability of a pattern string hypothesis appearing in the language is provided by language model 110, and the legitimate patterns are specified by the lexicon 112 above, respectively.

The probability of the observed sequence of feature vectors given the string hypothesis, p(O|W) is expanded under the present invention by introducing two hidden process, one for the frame-based model and one for the segment model. Specifically, p(O|W) is expanded to:

$$p(O \mid W) = \sum_{q^h} \sum_{q^s} p(O, q^h, q^s \mid W) \quad \text{EQ. 3}$$
$$= \sum_{q^h} \sum_{q^s} p(O \mid q^h, q^s) p(q^s \mid q^h) p(q^h \mid W)$$

where $q^s$ and $q^h$ are sequences of hidden states for the segment model and the frame-based model, respectively, $p(q^h|W)$ is the probability of a sequence of frame states $q^h$ given the string hypothesis, $p(q^s|q^h)$ is the probability of a sequence of segment states $q^s$ given the sequence of frame states, and $p(O|q^h,q^s)$ is the probability of the observed sequence of feature vectors O given the sequence of segment states and the sequence of frame states. The inner summation of Equation 3 is performed across all possible sequences of segment states and the outer summation is performed across all possible sequences of frame states.

Under some embodiments of the invention, the probability of a sequence of frame states given a string hypothesis $p(q^h|W)$ is provided by a frame-based Hidden Markov Model. Specifically, the Hidden Markov model provides the total probability of all of the transitions in the sequence of frame states as well as an indicator function that indicates whether the sequence of frame states is valid for the string hypothesis.

The probability of the observed sequence of feature vectors given the sequence of segment states and the sequence of frame states, $p(O|q^h,q^s)$, can be further decomposed into the individual probabilities due to each state type. In terms of an equation:

$$p(O|q^h,q^s)=p(O|q^s)\alpha p(O|q^h) \quad \text{EQ. 4}$$

where $\alpha$ is a segment model weight, $p(O|q^s)$ is the probability of the observed sequence of feature vectors given the sequence of segment states and $p(O|q^h)$ is the probability of the observed sequence of feature vectors given the frame states.

Using the independent observation assumption of Hidden Markov Models, the probability of the observed sequence of feature vectors given the sequence of frame states, $p(O|q^h)$, may be decomposed into the product of individual probabilities so that:

$$p(O \mid q^h) = \prod_{i=0}^{T-1} p(o_t \mid q_t^h) \quad \text{EQ. 5}$$

where $o_t$ is the $t^{th}$ observed feature vector, $q_t^h$ is the $t^{th}$ frame state, T is the total number of observed feature vectors, and each $p(o_t|q_t^h)$ is the probability of an individual observed feature vector given the current frame state. Under one embodiment, each individual probability for a frame state, $p(o_t|q_t^h)$, is provided by a Hidden Markov Model for that state.

The probability of the sequence of observed feature vectors given the sequence of segment models, $p(O|q^s)$ in Equation 4, can similarly be decomposed by assuming that the segments are independent of each other. This results in:

$$p(O \mid q^s) = \prod_{i=1}^{I} p(Y_i \mid q_i^s) \quad \text{EQ. 6}$$

where $Y_i$ denotes the $i^{th}$ segment, $q_i^s$ denotes the $i^{th}$ segment model state, I is the total number of segments, and $p(Y_i|q_i^s)$ is the probability of an individual segment given the segment state.

Each segment state is defined by a segment label, $e_i$, and a segment length. To integrate the segment model and the frame-based model, the segment label is taken from the set of modeling units used in the frame-based model. For example, if the modeling unit used by the frame-based model for a speech recognition embodiment is a monophone, the segment labels would be taken from the set of all possible monophones. Note that, even for a speech recognition embodiment, the invention is not limited to using monophones as the sub-word unit and other units such as a triphone or phone-pair may be used. (A detailed description of phone-pair segments can be found in a related application entitled "SPEECH RECOGNITION METHOD AND APPARATUS UTILIZING MULTI-UNIT MODELS", having attorney docket number M61.12-309 and filed on even date herewith, the contents of which are hereby incorporated by reference.)

As discussed further below, the length of a segment is set based on the assumption that the boundaries of the modeling units in the frame-based model must align with the boundaries in the segment model. As such, the length of a segment is determined implicitly by the segmentation generated by the frame-based model. In other words, the way in which the frame-based model assigns the frame states to the modeling units determines the length of the segments to be used in determining the segment model probabilities.

Using the segment length and segment label, the individual terms on the right hand side of Equation 6 can be converted into:

$$p(Y_i|q_i^s)=p(o_{t_i}^{t_{i+1}}|e_i) \quad \text{EQ. 7}$$

where $o_{t_i}^{t_{i+1}}$ represents a sub-sequence of observed feature vectors $o_{t_i}, o_{t_i+1}, \ldots, o_{t_{i+1}-1}$ from the start of the current segment to the end of the current segment, $e_i$ is the current segment label, and $p(o_{t_i}^{t_{i+1}}|e_i)$ is the probability of the sub-sequence of observed feature vectors given the segment label. Note that the length of the current segment is implied by the number of observed feature vectors that are included in the current segment.

The degree to which the frame-based model has properly identified the segment boundaries is included in the middle term, $p(q^s|q^h)$, of Equation 3 bove. This term gives the probability of a sequence of segment states given the sequence of frame states. This probability can be decomposed into the product of a set of probabilities that each describe the likelihood that a particular segment will last as long as the frame-based model predicts. Thus, this middle term can be calculated as:

$$p(q^s \mid q^h) = \prod_{i=1}^{t} p(t_i, t_{i+1} \mid e_i) \quad \text{EQ. 8}$$

where $t_i, t_{i+1}$ indicates the length of the segment as set by the frame-based model, $e_i$ is the segment label, and $p(t_i, t_{i+1}|e_i)$ is the probability of the segment having the length set by the frame-based model given the segment label. In one embodiment, the individual duration probabilities, $p(t_i, t_{i+1}|e_i)$, are modeled by an ergodic Poisson mixture distribution. Note that this term allows both the frame-based model and the segment model to equally. contribute to jointly optimal segmentations.

As mentioned above, the present invention can choose to combine several modeling units in a frame-based method into one segment unit. For example, in a speech recognition embodiment, the segment model can use phone-pairs as segment units. A phone pair is simply two phones next to each other. It differs from a diphone because each individual phone appears in two phone-pair segments that overlap each other. Thus, for a phone sequence of . . . ABCD . . . , the following phone-pair segments would be evaluated: _A, AB, BC, CD, D_. To utilize a phone-pair segment, an overlapped evaluation can be performed where each phone is evaluated twice to model the cross-segment dependency (For more information on phone-pairs see the application entitled "SPEECH RECOGNITION METHOD AND APPARATUS UTILIZING MULTI-UNIT MODELS" cited above)

When a plurality of frame-based molding units are combine into a composite segment unit, overlapped evaluation must be employed. To perform this overlapped evaluation, a small change must be made to Equation 7. Specifically, for composite segments, Equation 7 becomes:

$$p(Y_i|q_i^s) = p(o_{t_{i-1}}^{t_i+1}|e_{i-1}, e_i) \qquad \text{EQ. 9}$$

where $o_{t_{i-1}}^{t_i+1}$ represents a sub-sequence of observed feature vectors from the start of the current composite unit to the end of the current composite unit, $e_{i-1}$ is the first frame-based modeling unit and $e_i$ is the second frame-based modeling unit in the current composite unit, respectively.

For composite segments that have a low occurrence in the training data, the segment is replaced by two frame-based modeling units, for example, context-dependent phone segments in a speech recognition embodiment. This results in:

$$p(Y_i|q_i^s) = p(o_{t_{i-1}}^{t_i}|e_{i-1})p(o_{t_i}^{t_i+1}|e_i) \qquad \text{EQ. 10}$$

To reduce the computations needed to arrive at the most likely pattern string, the present invention may be implemented using dynamic programming such as a Viterbi search algorithm. Under such an implementation, hypothesized string paths are pruned at the predicted segment boundaries as the system sequentially processes the input feature vectors.

The pruning is performed based on path scores generated for each pattern string path up to the current segment boundary. Under one embodiment, each segment unit has at least one path score at each segment boundary. The path scores are generated using equations 2 through 8 above, meaning that the path scores include influences from the frame-based model, the segment model, and the degree to which the frame-based model predicts the correct durations for the segments. In some embodiments, the language model is added as a search space providing an additional factor in each path score. Methods of including a language model in path scores are well known.

Under one embodiment of the invention, the benefits of combining a frame-based model with a segment model are exploited to improve the training of the two models. As shown in FIG. 2, the segment model and the frame-based model are trained by a trainer component 140 based in part on a training pattern sequence 142, and the output of the feature extractor 104.

Figure 3:
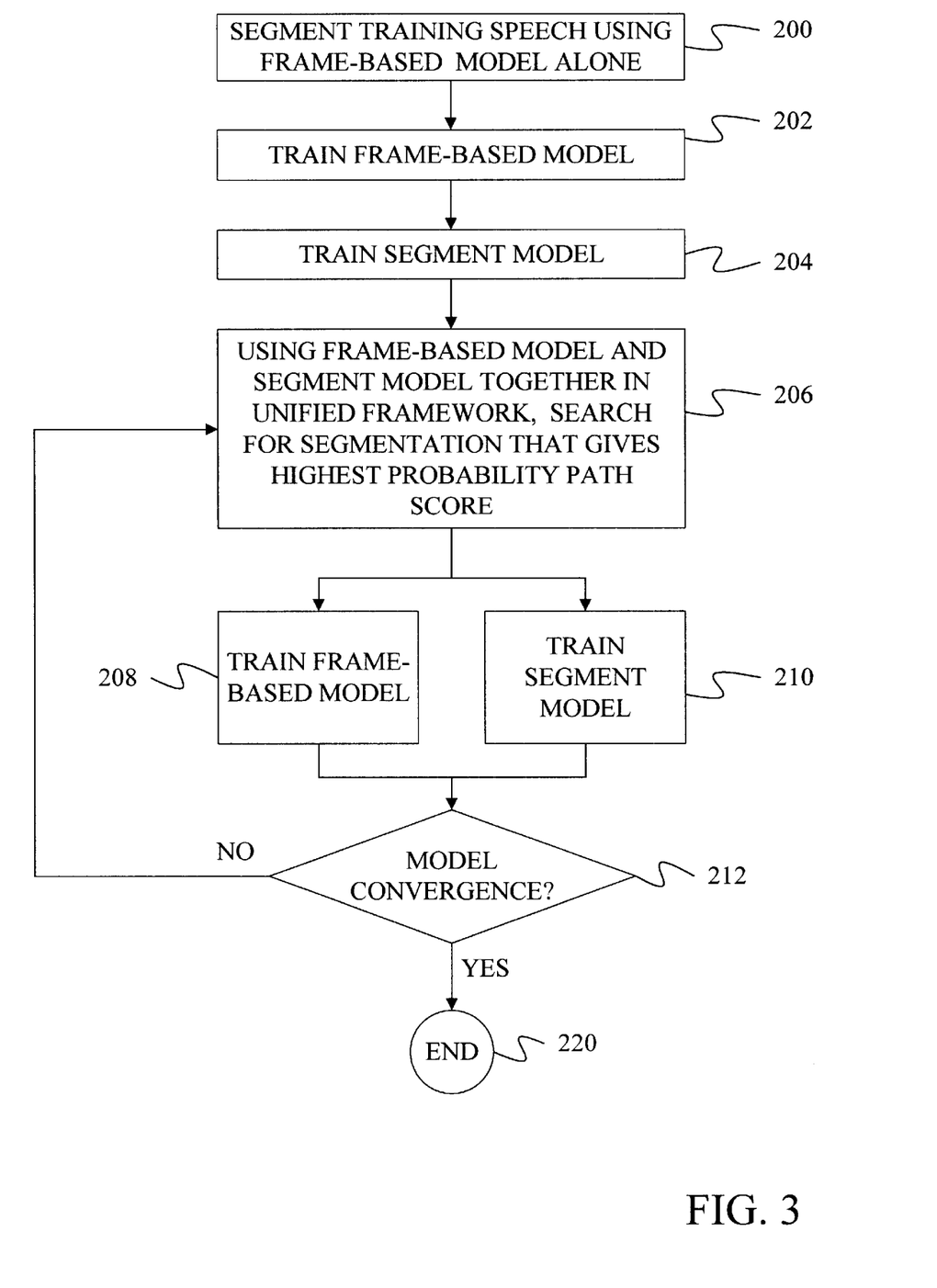
FIG. 3 is a flow diagram of a method for training a speech recognition system of the present invention.

FIG. 3 shows a flow diagram of a method of training the frame-based model and the segment model under one embodiment of the present invention. At step 200 of FIG. 3, the feature vectors generated from a training signal corresponding to the training pattern sequence are segmented using the segmentation algorithms of the frame-based model. For example, in speech recognition embodiments, the feature vectors generated by a speaker reading from a training text are segmented. This segmentation identifies the boundaries of sub-units in the input feature vectors. For example, in speech recognition, the segmentation identifies the boundaries of sub-word units. Using the segmented input feature vectors and the training pattern sequence, trainer 140 then builds or trains the frame-based model at step 202. Under one embodiment, this training involves identifying sets of probability distributions for each frame state.

At step 204, the segment model is trained using the segmentation identified by the frame-based model. Under one embodiment, this involves training a trajectory model having localized probability distributions at each frame that are centered about a smooth trajectory curve passing through the segment.

Once the segment model and the frame-based model have been trained, the models are used together to identify the most likely segmentation for the input feature vectors. This can be achieved using a Viterbi search algorithm to find a segmentation that maximizes the training pattern's path score, where the path score is produced using equations 2 through 8 above. Thus, at each frame in the training signal, only the best segmentations ending at each frame state are kept. This segmentation can be performed by using the decoder 106 with the training pattern sequence as the only legal sequence of patterns to search. This procedure is often referred as forced alignment.

Using the segmentation generated in step 206, the frame-based model and the segment model are then retrained at steps 208 and 210, respectively. Both models from step 206 are then compared to the previous models to determine if the models have converged. This comparison is shown as step 212. If the models have not converged, the process returns to step 206 to determine a new segmentation using the retrained versions of the frame-based model and the segment model. If the models have converged, the process of FIG. 3 ends at step 220.

Although the present invention has been described with reference to particular embodiments, workers skilled in the art will recognize that changes may be made in form and detail with out departing from the spirit and scope of the invention.

What is claimed is:

1. A temporal signal recognition system for identifying patterns from a series of feature vectors, the system comprising:

a frame-based model capable of providing a probability that an individual feature vector would be produced given a frame state;

a segment model capable of providing a probability of a sub-sequence of feature vectors given a single segment state; and a decoder capable of generating a path score that is indicative of the probability that a sequence of patterns is represented by the series of feature vectors, the path score being based in part on the frame-based model and the segment model.

2. The temporal signal recognition system of claim 1 wherein the temporal signal represents speech and the patterns represent words.

3. The temporal signal recognition system of claim 1 wherein the decoder is further capable of generating multiple path scores, each path score indicative of a separate probability that a separate sequence of patterns is represented by the series of feature vectors.

4. The temporal signal recognition system of claim 1 further comprising a language model capable of providing a probability that a sequence of patterns will appear in an environment wherein the path score is further based on the language model.

5. The temporal signal recognition system of claim 1 wherein the path score is further based on a probability that the segment states will have lengths that match the lengths hypothesized for the segment states by the frame-based model.

6. The temporal signal recognition system of claim 1 wherein the path scores are based in part on the equation $$p(O|W) = \sum_{q^h} \sum_{q^s} p(O|q^h, q^s) p(q^s|q^h) p(q^h|W),$$

where $p(O|W)$ is the probability that a pattern string hypothesis along a path will generate the series of feature vectors, $q^s$ and $q^h$ are sequences of hidden states for the segment model and the frame-based model, respectively, $p(q^h|W)$ is the probability of a sequence of frame states $q^h$ given the pattern string hypothesis, $p(q^s q^h)$ is the probability of a sequence of segment states $q^s$ given the sequence of frame states, and $p(O|q^h,q^s)$ is the probability of the series of feature vectors O given the sequence of segment states and the sequence of frame states.

7. The temporal signal recognition system of claim 1 further comprising a trainer capable of training the frame-based model and the segment model based on a training text and a segmented series of feature vectors, the segmentation of the segmented series of feature vectors being determined using a probability score that includes both a frame-based model component and a segment model component.

8. A method of speech recognition comprising:
   determining a frame-based probability for a sequence of input feature vectors by determining the correspondence between each individual feature vector in the sequence of feature vectors and a respective individual frame state from a sequence of frame states;
   dividing the sequence of feature vectors into sub-sequences of feature vectors;
   determining a segment-based probability for the sequence of input feature vectors by determining the correspondence between the feature vectors in each sub-sequence of feature vectors and a respective segment state from a sequence of segment states; and
   combining at least the frame-based probability and the segment-based probability to identify a most likely sequence of patterns that can be represented by the input sequence of feature vectors.

9. The method of claim 8 wherein identifying a most likely sequence of patterns comprises identifying a most likely sequence of entries in a lexicon.

10. The method of claim 8 further comprising determining a duration probability indicative of the likelihood of the sequence of segment states given the sequence of frame states and further combining the duration probability with at least the frame-based probability and the segment-based probability when identifying a most likely sequence of patterns.

11. The method of claim 10 wherein dividing the sequence of feature vectors into sub-sequences of feature vectors comprises segmenting the feature vectors based on the sequence of frame states.

12. The method of claim 10 wherein determining the duration probability comprises determining the likelihood that each segment state will have a length that spans all of the feature vectors in the sub-sequence assigned to the segment state.

13. The method of claim 10 further comprising determining a state-sequence probability for the sequence of frame states by determining the likelihood of the sequence of frame states given a pattern string hypothesis and further combining the state-sequence probability with at least the frame-based probability, the duration probability and the segment-based probability when identifying a most likely sequence of patterns.

14. The method of claim 8 further comprising determining a language model probability that is indicative of the likelihood of a sequence of patterns in an environment and further combining the language model with at least the frame-based probability and the segment-based probability when identifying a most likely sequence of patterns.

15. A method of training a pattern recognition system using feature vectors generated from a training signal, the method comprising:
   selecting a unified-framework segmentation for a sequence of feature vectors based on a probability associated with the segmentation, the probability comprising a frame-based probability produced by a frame-based model and a segment-based probability produced by a segment-based model;
   retraining the frame-based model using the segmentation of the sequence of feature vectors and a training pattern sequence; and
   retraining the segment-based model using the segmentation of the sequence of feature vectors and the training pattern sequence.

16. The method of claim 15 further comprising:
   before selecting a unified-framework segmentation, selecting an initial segmentation based on the frame-based model but not the segment-based model;
   training the frame-based model using the initial segmentation; and
   training the segment-based model using the initial segmentation.

17. The method of claim 15 further comprising:
   determining whether the frame-based model and the segment-based model have converged; and
   if the framed-based model and the segment model have not converged, selecting a new unified-framework segmentation based on the frame-based probability and the segment-based probability.

18. A computer-readable medium having computer-executable components for performing steps comprising:
   determining a frame-based probability for a sequence of input feature vectors by separately determining the likelihood of each feature vector based on a corresponding frame state from a sequence of frame states;
   segmenting the feature vectors into segments;
   determining a segment-based probability for the sequence of input feature vectors by determining the total likelihood of the feature vectors assigned to a segment given a corresponding segment state from a sequence of segment states; and
   combining at least the frame-based probability and the segment-based probability to identify a most likely sequence of patterns that can be represented by the input sequence of feature vectors.

19. The computer-readable medium of claim 18 having computer-executable instructions for performing the further step of determining a duration probability indicative of the likelihood of the sequence of segment states given the sequence of frame states.

20. The computer-readable medium of claim 19 wherein the determining the duration probability comprises determining the likelihood that the segment state will have a length that spans all of the feature vectors in the corresponding segment.

21. The computer-readable medium of claim 20 wherein the duration probability is combined with the frame-based probability and the segment-based probability to identify a most likely sequence of patterns.

22. The computer-readable medium of claim 21 having computer-executable instructions for performing a further step of determining a state-sequence probability that is indicative of the likelihood of a sequence of frame states given a pattern string hypothesis.

* * * * *

UNITED STATES PATENT AND TRADEMARK OFFICE
CERTIFICATE OF CORRECTION

PATENT NO. : 6,662,158 B1
DATED : December 9, 2003
INVENTOR(S) : Hon et al.

It is certified that error appears in the above-identified patent and that said Letters Patent is hereby corrected as shown below:

Column 2,
Line 11, delete "," after "hidden "

Column 8,
Line 54, "bove" should be -- above --

Column 7,
Line 42, " $p(O|q^h, q^s) = p(O|q^s) p(O|q^h)$ " should be -- $p(O|q^h, q^s) = p(O|q^s)^\alpha p(O|q^h)$ --

Column 9,
Line 30, " $p(Y_i | \overset{s}{q_i}) = p(o_{i-1}^{t_{i+1}} | e_{i-1}, e_i$ " should be -- $p(Y_i | q_i^s) = p(o_{t_{i-1}}^{t_{i+1}} | e_{i-1}, e_i)$ --

Line 31, " $o_{t_{i-1}}^{t_{i+1}}$ " should be -- $o_{t_{i-1}}^{t_{i+1}}$ --

Column 11,
Line 27, " $p(q^s q^h)$ " should be -- $p(q^s | q^h)$ --

Signed and Sealed this

Tenth Day of August, 2004

JON W. DUDAS
*Acting Director of the United States Patent and Trademark Office*